United States Patent

[11] 3,547,354

[72] Inventors Walton D. Greathouse Huffman;
James H. Cheek; John R. Spencer,
Houston, Tex.
[21] Appl. No. 758,085
[22] Filed Sept. 6, 1968
[45] Patented Dec. 15, 1970
[73] Assignee Continental Oil Company
Ponca City, Okla.
a corporation of Delaware

[54] GAS FLOW DIFFUSER
2 Claims, 3 Drawing Figs.
[52] U.S. Cl. .................................................. 239/500;
23/284, 23/288; 34/231; 239/522
[51] Int. Cl. ..................................................... B05b 1/26
[50] Field of Search............................................ 34/29, 34,
168, 174, 218, 231, 232, (Damper & Deflector
Digest); 239/504, 528, 559, 567, 553, 553.3;
55/418; 23/284, 288; 239/500, 522

[56] References Cited
UNITED STATES PATENTS
2,325,657 8/1943 Burkness........................ 55/387X

| | | | |
|---|---|---|---|
| 2,553,561 | 5/1951 | Evans............................ | 34/168UX |
| 2,591,173 | 4/1952 | Marken......................... | 34/174 |
| 2,739,664 | 3/1956 | Parks............................. | 55/33 |
| 2,995,208 | | Hachmuth.................... | 55/33 |

FOREIGN PATENTS
1,279,437 11/1961 France ........................ 110/119

Primary Examiner—Frederick L. Matteson, Jr.
Assistant Examiner—Harry B. Ramey
Attorneys—Joseph C. Kotarski, Henry H. Huth, Jerry B. Peterson, Van D. Harrison, Jr. and Carroll Palmer ABSTRACT: A gas flow diffuser including a rigid, tubular gas-permeable member having an imperforate plate extending transversely thereacross against which a gas flowing axially through the tubular member impinges, and is diverted through the permeable wall of the tubular member. A deflector plate is positioned in the path of gas flow through the tubular member and is spaced upstream from the imperforate plate. The diffuser is especially adapted for use in a body of particulate packing for preventing destructive impact of a gas stream upon particles of the packing, and yet permitting the gas to be circulated through the particles.

PATENTED DEC 15 1970

3,547,354

INVENTORS
WALTON D. GREATHOUSE,
JAMES H. CHEEK &
BY JOHN R. SPENCER

Van D. Harrison, Jr.
AGENT 3,547,354

1

GAS FLOW DIFFUSER

BACKGROUND OF THE INVENTION

1. Field of the Invention

This invention relates broadly to baffle devices, and more specifically, to gas flow diffuser devices.

2. Description of the Prior Art

Several methods currently in use for treating gas streams require that the gas be directed through beds of particulate material. In some instances, the gas enters the bed of particulate material at a velocity such that its direct impingement upon the particles or granules of solid material agitates these particles, resulting in their erosion and disintegration. Material is therefore lost from the bed and the efficiency of the process is considerably lessened.

SUMMARY OF THE PRESENT INVENTION

This invention is a gas flow diffuser device adapted for location in or adjacent a bed of particulate material, and for connection to a conduit or pipe for receiving a flowing gas stream therefrom. Broadly described, the flow diffuser of the invention comprises a gas-permeable tubular member having an imperforate plate extending transversely thereacross and obstructing the path of gas flowing axially in the tubular member. A deflector plate is also positioned in the gas flow path upstream from the imperforate plate. In a preferred embodiment of the invention, the tubular member is a relatively rigid, perforated element, and the diffuser further includes means for detachably securing the tubular member in an opening through a tank or other container.

In one aspect, the invention embodies the combination of the described diffuser with a container and with a solid particulate material which is positioned inside the container adjacent the tubular member. A port or opening is formed in the container in alignment with the tubular member for admitting gas to the interior of the container through the diffuser.

An object of this diffuser device is to prevent eroding impingement of high velocity gas upon solid particles through which the gas is to be passed.

Another object of this invention is to provide a device for dissipating the kinetic energy of a flowing gas by abruptly changing its direction of flow immediately upstream from the initial point of contact of the gas with a bed of frangible, solid particles.

A further object of the invention is to provide a compact, mechanically strong and durable gas diffuser device which can be quickly and easily interposed in the flow path of high velocity gas about to enter a container or tank containing a bed of frangible or friable solid particles.

Additional objects and advantages of the invention will become apparent as the following detailed description of the invention is read in conjunction with a perusal of the accompanying drawing.

DETAILED DESCRIPTION OF A PREFERRED EMBODIMENT OF THE INVENTION

Figure 1:
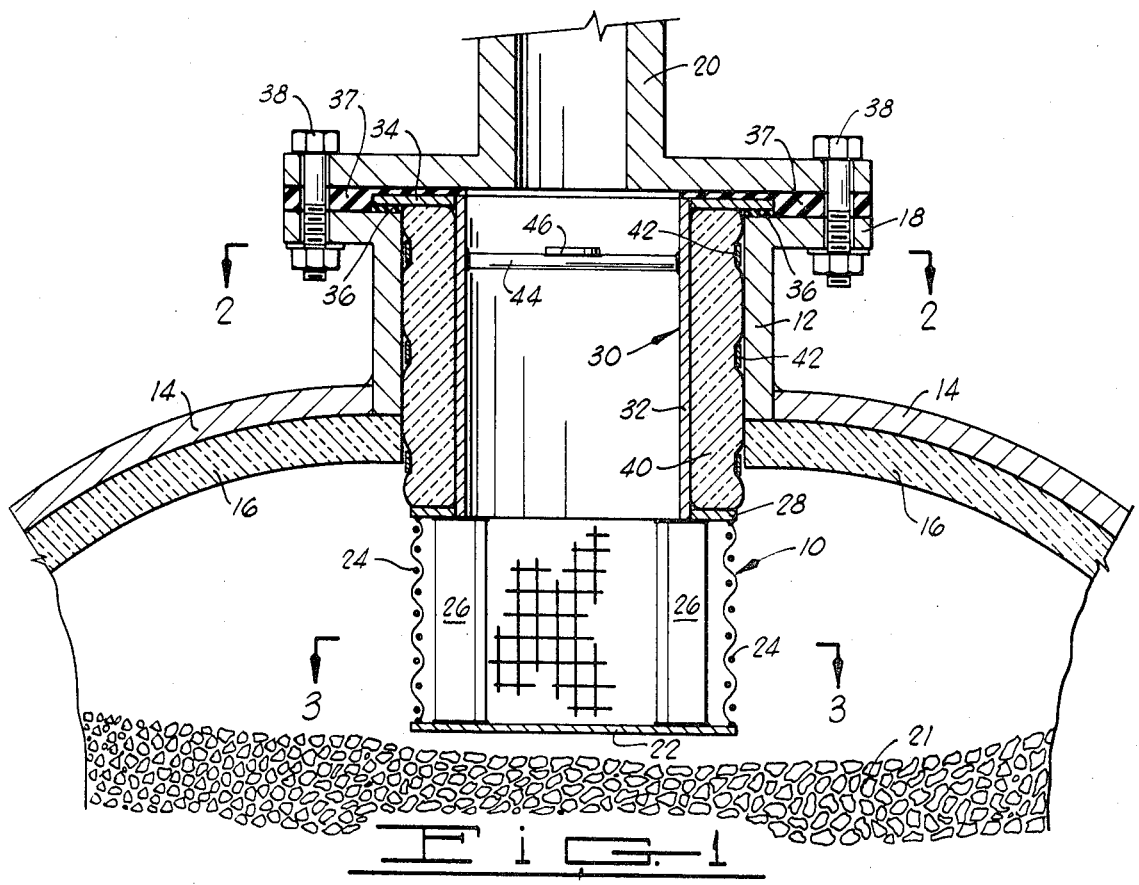
FIG. 1 is a vertical sectional view of the flow diffuser device constructed in accordance with the present invention.
Figure 2:
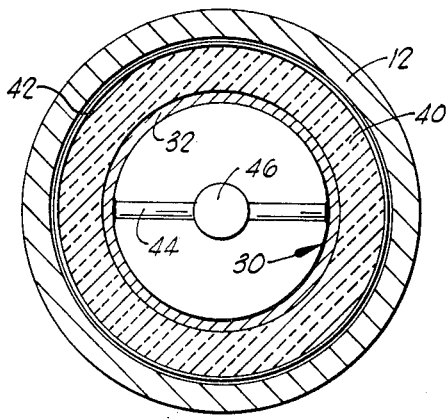
FIG. 2 is a sectional view taken along line 2-2 of FIG. 1.
Figure 3:
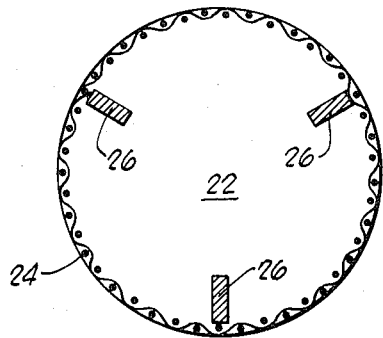
FIG. 3 is a sectional view taken along line 3-3 of FIG. 1.

Referring initially to FIG. 1 of the drawings, the gas flow diffuser device of the invention is designated generally by reference numeral 10 and is illustrated as it appears when mounted or secured in the manway 12 of a tank 14. The tank 14 may be typically constructed with a lining or layer of insulation material 16 on the interior thereof, and with the manway 12 having a radially outwardly extending, apertured flange 18 to which may be secured a duct, pipe or conduit 20 for introducing a gas to the interior of the tank 14. The gas diffuser device 10 of the present invention is especially useful for the diffusion of a gas to reduce its velocity prior to the entry of the gas into a bed of solid particles 21, and such bed of particles is illustrated in FIG. 1 as positioned in the tank 14 below the diffuser device.

The gas flow diffuser device 10 of the invention includes an imperforate plate 22 which, in the illustrated embodiment, is shown as secured across one end of a tubular, gas-permeable member 24. In this embodiment of the invention, the tubular gas-permeable member 24 is a cylindrical body of mesh material, such as steel wire cloth or a screen, and the imperforate plate 22 is a disc having a circular periphery. The tubular screen or wire cloth member 24 can have its lower end secured to the plate 22 by soldering, welding or any other suitable means. For purposes of reinforcing and strengthening the tubular member 24, a plurality of axially extending, circumferentially spaced stiffening bars 26 are positioned with one edge of each bearing against the inside of the tubular member 24 and with the lower end of each bar secured to the imperforate plate 22. The upper end of each bar 26 is secured to the lower side of an annular flange 28 forming a portion of an insert nozzle designated generally by reference numeral 30.

The insert nozzle 30 includes, in addition to the annular flange 28, a cylindrical body 32 which has secured around the upper end thereof, an annular supporting flange 34 which has a larger outside diameter than the inside diameter of the manway 12. The annular supporting flange 34 preferably bears against a sealing gasket 36 which forms a seal between this flange and between the flange 18 of the manway 12. An additional gasket 37 is then interposed between the manway flange 18 and the supporting flange 34 and the flanged end of the gas feed pipe or conduit 20 which is bolted to the manway flange by suitable bolts 38. Disposed around the outside of the cylindrical body 32 of the insert nozzle 30 is a protective layer of insulation 40 which, in a preferred embodiment of the invention, is a fiberglass blanket. The fiberglass blanket 40 is retained around the cylindrical body 32 of the insert nozzle 30 by a plurality of metallic bands 42 which are preferably constructed of stainless steel. The thickness of the fiberglass blanket 40 is such that the entire insert nozzle assembly will fit snugly in the manway 12 when it pressed into the illustrated position. To facilitate manipulation of the gas flow diffuser device 10, and specifically, its positioning in and removal from the manway 12 or any other opening in which it might be used, a lifting bar 44 extends diametrically across the cylindrical body 32 a short distance downwardly from the upper end thereof. A relatively small-diameter gas deflector plate 46 is welded or otherwise suitably secured to a medial portion of the lifting bar 44.

OPERATION

In the operation of the gas flow diffuser device of the invention, the device is first positioned in the path of gas flow into a tank, such as the tank 14, by pressing the insert nozzle 30 downwardly in the opening in the tank so that the fiberglass blanket 40 fits snugly in the opening, and the annular flange 34 is brought to bear against the gasket 36. The conduit or pipe 20 used to feed gas to the tank 14 is then connected to the manway flange 18 by bolts 38 as shown in FIG. 1, or by any other suitable means. When the gas flow diffuser device 10 has been positioned within the tank in the manner described, the tubular, gas-permeable member 24 may be located above the bed of solid particulate material 21 as shown, or in other instances, may actually be surrounded by this material. There will, however, be no solid particulate material in the enclosure defined by the imperforate plate 22 and the gas permeable tubular member 24.

When gas flow is commenced, gas enters the cylindrical body 32 of the insert nozzle 30, and a central portion of the gas stream strikes the deflector plate 46 and is deflected radially outwardly. This effectively reduces the average velocity of the entire gas stream and produced turbulence in the moving gas. Thus, as the gas enters the gas-permeable tubular member 24, it is in a turbulent state and reduced in velocity. The deflector plate 46 effectively causes a greater portion of the gas entering the tubular member 24 to pass radially outwardly through the upper end portion of this member than would otherwise occur. The imperforate plate 22 at the lower end of the tubular member 24 obstructs the axial flow of gas through the tubular member and diverts it through the sidewall of the tubular member. In passing through the tubular member 24, the wire mesh further reduces the velocity of the entering gas. Consequently, there is little resulting disintegration of the solid particles 21, and they are not abraded or eroded to any substantial extent, when the gas contacts and passes through them.

Although a preferred embodiment of the invention has been herein shown and described, changes and modifications can be made in the illustrated and described structure without departure from the basic principles of the invention. Changes and innovations of this type are therefore deemed to be circumscribed by the spirit and scope of the invention, except as the same may be necessarily excluded by the appended claims or reasonable equivalents thereof.

We claim:
1. A gas flow diffuser comprising:
 a. a tubular, gas-permeable member;
 b. an imperforate plate extending substantially completely across said tubular member in a transverse direction;
 c. an insert nozzle secured to one end of said tubular gas-permeable member, said insert nozzle having a gas flow passageway therethrough communicating with the interior of said tubular member and comprising:
  1. a rigid cylindrical body having an end secured to said one end of said tubular member;
  2. an insulation material around said rigid cylindrical body; and
  3. an annular support flange around the opposite end of said cylindrical body from its end secured to said tubular member for supporting said insert nozzle in an opening into which said cylindrical body is inserted;
 d. a deflector plate positioned in said gas flow passageway and spaced from said tubular member, and extending substantially parallel to said imperforate plate for deflecting gas radially outwardly in said tubular member; and
 e. a lifting bar extending diametrically across said cylindrical body and having said deflector plate secured to a medial portion thereof.

2. A gas flow diffuser comprising:
 a. a wire mesh cylinder;
 b. an imperforate plate extending in a transverse direction across and closing one end of said wire mesh cylinder;
 c. a deflector plate positioned in the path of gas flow into said wire mesh cylinder upstream from said imperforate plate and extending substantially parallel to said imperforate plate for deflecting gas radially outwardly in said wire mesh cylinder; and
 d. an insert nozzle secured to one end of said wire mesh cylinder, comprising:
  1. a rigid cylindrical body having an end secured to one end of said wire mesh cylinder;
  2. a supporting flange extending outwardly from the cylindrical body and spaced from its end secured to the wire mesh cylinder; and
  3. a lifting bar inside said rigid cylindrical body and having said deflector plate secured thereto, said insert nozzle having a gas flow passageway therethrough communicating with the interior of said wire mesh cylinder and said deflector plate being disposed inside said insert nozzle in spaced relation to the walls thereof.